Sept. 28, 1965 O. E. COTE 3,208,560
SELF-ALIGNING LOCKABLE HEAD ASSEMBLY
FOR PIPE HANGER INSERTS
Filed Dec. 26, 1961 2 Sheets-Sheet 1
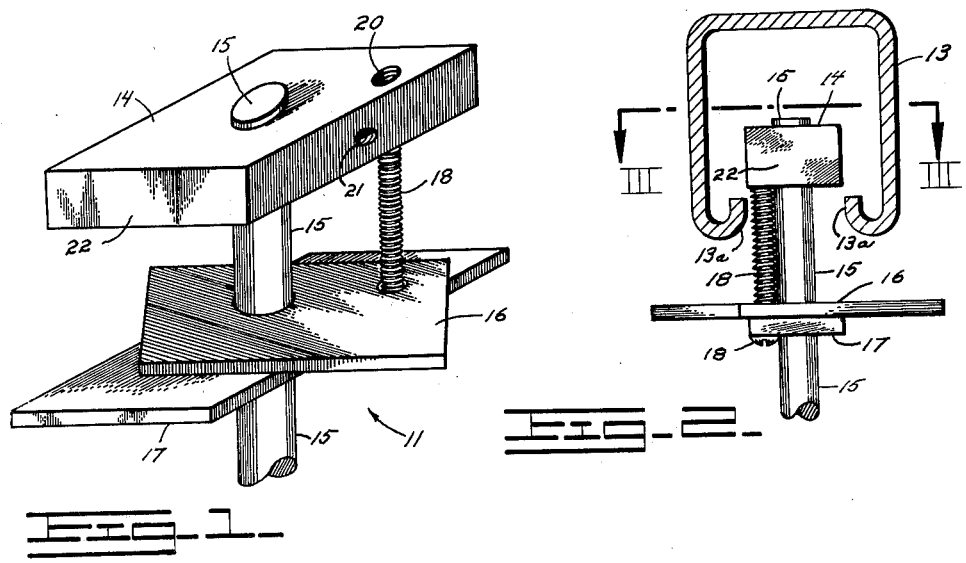
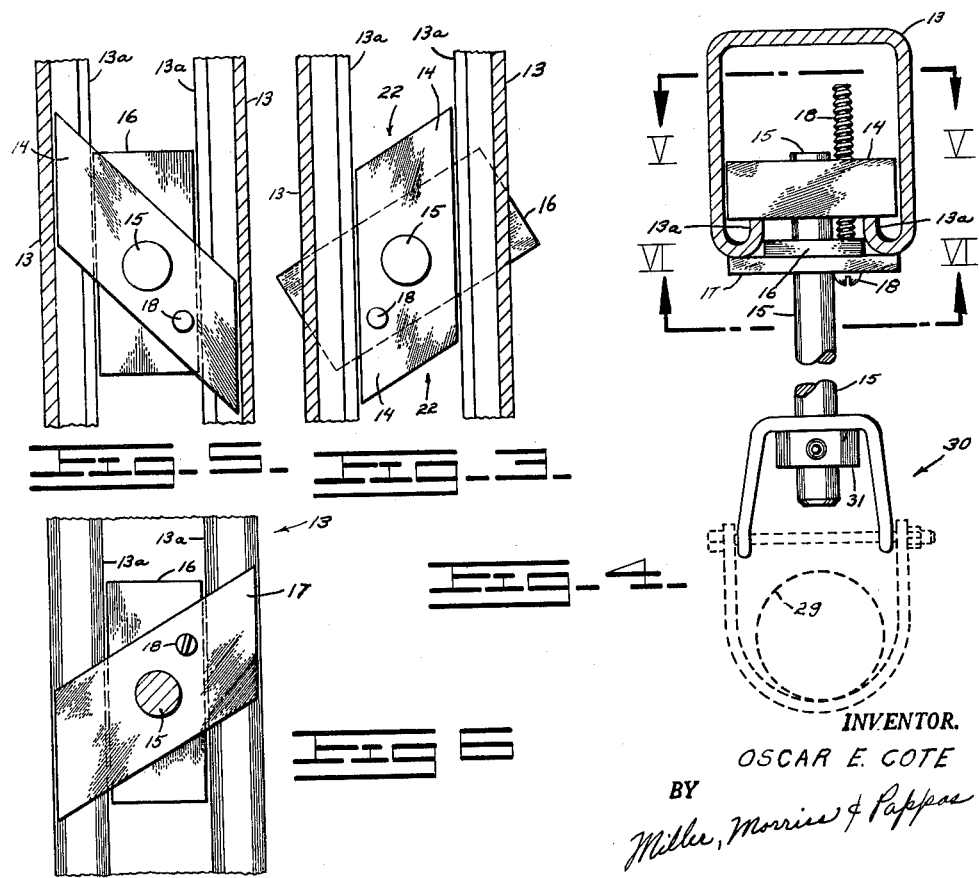
INVENTOR.
OSCAR E. COTE
BY Sept. 28, 1965     O. E. COTE     3,208,560
SELF-ALIGNING LOCKABLE HEAD ASSEMBLY
FOR PIPE HANGER INSERTS
Filed Dec. 26, 1961     2 Sheets-Sheet 2
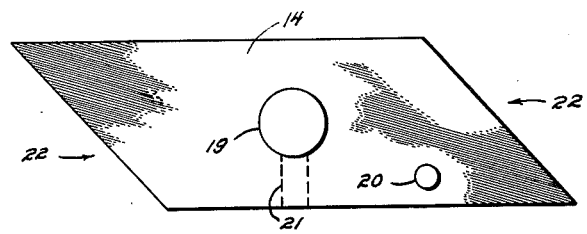
Fig. 7.
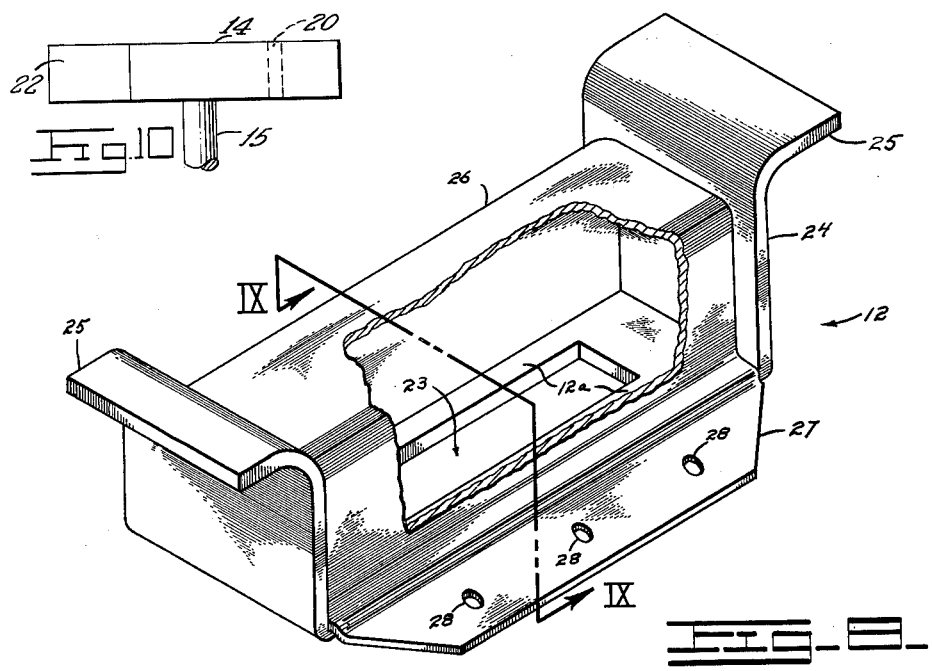
Fig. 10.
Fig. 8.
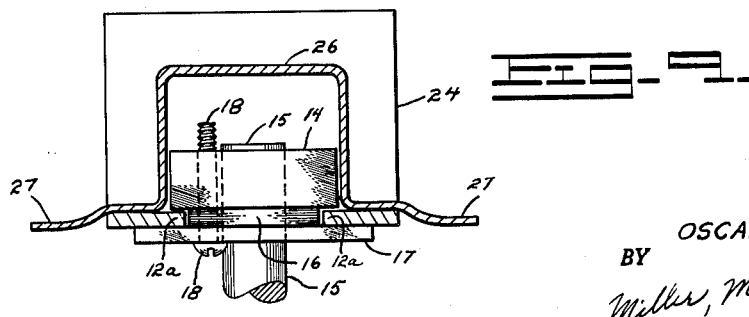
Fig. 9.
INVENTOR.
OSCAR E. COTE
BY Miller, Morris & Pafferd United States Patent Office 3,208,560
Patented Sept. 28, 1965

1

3,208,560
SELF-ALIGNING LOCKABLE HEAD ASSEMBLY
FOR PIPE HANGER INSERTS
Oscar E. Cote, 2039 Culver St., Lansing, Mich.
Filed Dec. 26, 1961, Ser. No. 161,910
5 Claims. (Cl. 189—36)

This invention relates to a head structure assembly for pipe hanger rods or connectors and more particularly to a pipe hanger insert structure having a lockable self-aligning head structure assembly for use in insert housings or continuous channel shaped support members.

Pipe hanger insert structures of the prior known art have utilized headed connectors or support rods for insertion into insert housings or continuous channel support members provided in or proximate to ceilings along which pipes are to be suspended. Generally, the heads of such connectors or support rods have been configured so that they were freely rotatable within the insert housing or channel support member into which they were inserted. Thus, such headed connectors could inadvertently fall out of the housing structure or become misaligned therein due to the shocks and vibrations normally found on all construction projects. Due to this fact, such headed connectors have had to be locked into position within their respective housings immediately upon insertion therein. This has proved to be expensive and time-consuming due to the fact that such headed connectors have subsequently had to be loosened during installation of the pipe so as to permit re-alignment or longitudinal adjustment of the headed connectors within the housing member in order to facilitate the installation of the pipe.

Further, none of the pipe hanger insert structures of the prior known art are provided with a headed connector which becomes automatically aligned in its proper use position immediately upon insertion into its respective housing. In addition, there have been no headed connectors which could be lockably aligned in their use position within the insert housing, but which were still free for longitudinal movement or adjustment within the housing prior to final locking or clamping of the headed connector to the housing structure. Thus, none of the pipe hanger insert structures of the prior known art have utilized a lockable headed connector which was lockably self-orienting or self-aligning upon installation within an insert structure or continuous channel shaped support member but which permitted longitudinal movement thereof within the housing prior to and during the installation of the pipe.

A need has therefore existed for a lockable headed connector which is automatically self-orienting or self-aligning upon installation into its operative use position within a housing structure. A need has also existed for a head assembly for a pipe hanger insert connector rod which is easily lockable into its properly oriented or aligned use position within the housing but which permits longitudinal movement thereof within the housing. A further need has existed for a self-aligning lockable head assembly which is adapted for easy insertion into an insert housing or channel shaped support member and which is selectively clampable into its fixed use position upon the flanged portions of the housing structure. A still further need has existed for a self-aligning lockable head assembly which is easily locked or clamped into position upon the flanged portions of a structure by a simple adjustment of means external of the housing structure and, thus, easily accessible to the person installing the pipe hanger insert structure assembly.

It is therefore an object of this invention to provide a lockable headed connector which is self-orienting or self-aligning upon operative assembly with an insert housing structure.

Another object of this invention is to provide a two-stage lockable head assembly which permits selective intermediate locking of the head assembly into its properly aligned or oriented use position within a housing structure but which still permits selective longitudinal movement of the head assembly within the housing prior to final locking of the head assembly into its final fixed use position.

Still another object of this invention is to provide a lockable self-aligning head assembly for use with connectors or support rods and which is adapted for clampable attachment to the flanged portions of insert housings or continuous channel shaped support members.

Yet another object of this invention is to provide a lockable self-aligning head assembly for attachment to connectors or support rods and which is comprised of simple components so as to permit quick on-the-job assembly.

A still further object of this invention is to provide a lockable self-aligning head assembly which is easily and economically fabricated and which is particularly amenable to high volume mass production and economical maintenance.

Other objects and advantages found in the construction of my invention will be apparent from a consideration of the following specification in connection with the appended claims and the accompanying drawings.

In the drawings:

FIGURE 1 is a perspective view showing the lockable self-aligning head assembly in association with a connector or pipe support rod and illustrating the adjusting or locking screw which actuates the clamping and alignment plates toward and away from the head block.

FIGURE 2 is a cross-sectional end view of a continuous channel shaped support housing member showing the head block of the head assembly inserted therein, prior to rotation thereof into its operative use position within the housing.

FIGURE 3 is a sectional view taken on line III—III of the FIGURE 2 showing the head block after it has been inserted into the housing but prior to rotation of the head block to its aligned use position within the housing.

FIGURE 4 is a cross-sectional end view such as that of FIGURE 2 showing the head assembly in its locked and aligned use position within the housing and illustrating the clamping action of the head block and clamp plate upon the flanges of the housing and further illustrating the critical positioning of the alignment or keeper plate intermediate the flange portions of the housing so as to prevent inadvertent rotation of the head block from its diagonal use position within the housing.

FIGURE 5 is a sectional view taken on line V—V of FIGURE 4 showing the diagonal positioning of the head block within the housing and illustrating the mating relationship of the alignment or keeper plate between the flange portions of the housing.

FIGURE 6 is a bottom view taken on line VI—VI of FIGURE 4 illustrating the clamping bar in its clamped use position diagonally across the bottom of the flanged portion of the housing and illustrating the alignment or keeper plate intermediate the flanges so as to automatically align the head assembly in its locked use position.

FIGURE 7 is a top view of the head block showing the transverse set screw arrangement which is utilized to lockably attach the head block to a connector or pipe support rod and showing the threaded hole which operatively receives the adjusting or locking screw.

FIGURE 8 is a perspective breakaway view of an insert housing that can be utilized with the instant invention and illustrating the slotted opening in the base of the insert housing through which the head block of the instant invention is inserted.

FIGURE 9 is a cross-sectional view of the insert housing taken on line IX—IX of FIGURE 8 showing the lockable self-aligning head assembly in its use position within the insert housing.

FIGURE 10 is a side elevational view of the head block showing a connector rod integral therewith.

*General description*

In general, a self-aligning lockable head assembly 11 is provided for selective use in association with an insert housing 12 or a continuous channel shaped support member 13.

As shown generally in the drawings, the head block 14 of the head assembly 11 is insertable into the insert housing 12 or channel shaped support member 13 and is rotated so as to assume a diagonal position within the housing 12 or support member 13. In this diagonal position, the head block 14 rests upon and is supported by the flanged portions 12a of the insert housing 12 or the flanged portions 13a of the continuous channel shaped support member 13.

A keeper or alignment plate 16 and a clamping plate 17 are slidably mounted on the connector or pipe support rod 15 in a parallel spaced apart relationship to the head block 14. The keeper plate or alignment plate 16 and the clamping plate 17 are operatively connected to and maintained in a pre-determined spaced apart orientation with the head block 14 by use of an adjusting or locking screw 18.

As will be described hereinafter in greater detail, the adjusting or locking screw 18 may be actuated to draw the clamping plate 17 toward the head block 14 so as to clamp upon the flanges 12a or 13a that are positioned between the clamping plate 17 and the head block 14. The keeper or alignment plate 16, kept in a pre-determined offset position with respect to the clamping plate 17 and head block 14 by action of the adjusting screws 18 passing therethrough, enters the space between the flanges 12a or 13a when the clamping plate 17 is drawn proximate to the base of the insert housing 12 or channel support member 13. When any portion of the keeper or alignment plate 16 is in position between the flanges 12a or 13a, the head assembly 11 cannot be inadvertently disengaged from the insert housing 12 or the channel support housing 13. With the keeper plate 16 thus positioned between flanges 12a or 13a, the head block 14 cannot accidentally be removed from the housing structure due to the inadvertent rotation thereof from its diagonal use position within the housing structure. This is true even though the clamping plate 17, and the head block 14 are not clamped upon the flanged portions of the housing structure.

It is thus seen that a head assembly is provided which can be lockably retained in its use position in association with a housing structure, but which selectively still permits the longitudinal movement of the head assembly longitudinally along the housing structure while thus locked.

*Specific description*

As shown in FIGURE 1, the self-aligning lockable head assembly 11 consists of a head block 14, a clamping plate 17, an intermediate keeper or alignment plate 16, and an adjusting or locking screw 18 which operatively connects the head block 14, the clamping plate 17 and intermediate keeper or alignment plate 16 together. The head assembly 11, as shown, is mounted upon a connector or pipe support rod 15 and cooperates therewith to provide a lockable and self-aligning headed pipe hanger insert structure.

As shown specifically in FIGURES 1 and 7, the head block 14 has a centrally located connector rod hole 19 therethrough so as to receive the end of a connector or pipe support rod 15. A threaded adjusting screw hole 20 is also provided through the head block 14 so as to operatively receive the adjusting or locking screw 18. A threaded set screw hole 21 is provided in the head block 14 transversely to the connector rod hole 19. A set screw (not shown) is positioned within the set screw hole 21 so as to selectively bear against and fixedly retain a connector or pipe support rod 15 positioned within the connector rod hole 19.

For purposes of on-the-job versatility and economy, the preferred embodiment of the invention utilizes a head block 14 which receives a separate connector or pipe support rod 15. However, it is within the scope of the invention to fabricate a headed connector wherein the head block 14 has an integrally provided connector or pipe support rod extension, thereby eliminating the need for on-the-job assembly. A head block 14 having an integrally formed connector rod 15 extending therefrom is shown in FIGURE 10.

The end surfaces 22 of the head block 14 are cut diagonally so as to fit against the inside walls of the housing structure when the head block 14 is rotated into its use position within the housing 12 or 13, as shown in FIGURES 4, 5 and 9. When the head block 14 is rotated into this position, the keeper or alignment plate 16 is directly below and in substantial register with the opening in the housing structure.

The clamping plate 17 is shaped substantially like the head block 14. The clamping plate 17 is provided with connector rod and adjusting screw receiving holes therethrough that are in coaxial register respectively, with the connector rod hole 19 and adjusting screw hole 20 provided in the head block 14. The connector rod hole provided in the clamping plate 17 is not threaded and is adapted to slidingly receive a connector rod 15 therethrough. The adjusting screw hole provided through the clamping plate 17 is of a size sufficient to permit the stem of the adjusting screw 18 to pass freely upwardly therethrough to operatively engage the head block 14, while the head of the adjusting screw operatively bears against the bottom surface of the clamping plate 17.

The alignment or keeper plate 16 is of a substantially rectangular elongate configuration. The width of the keeper plate 16 is slightly less than the width of the slotted opening of the insert housing 12 or the width of the opening in the continuous channel shaped support member 13. This width permits selective movement of the keeper or alignment plate 16 into or out of the opening between the flanged portions 12a or 13a. The alignment or keeper plate 16 is also provided with unthreaded connector rod and adjusting screw holes which are adapted to slidingly receive the connector rod 15 and the adjusting screw 18, respectively, therethrough. When the keeper plate is in its operative use position intermediate the clamping plate 17 and the head block 14, the holes provided therethrough are coaxial with the similar holes provided through the clamping plate 17 and the head block 14. It should be pointed out that the connector rod and adjusting screw holes provided through the keeper plate 16 are so positioned that when the keeper plate 16 is assembled between the clamping plate 17 and head block 14, with the connector rod 15 and adjusting screw 18 therethrough, the longitudinal axis of the keeper plate 16 is offset from the longitudinal axis of the head block 14 and of the clamping plate 17. This offset relationship is such that when the head block 14 is rotated to a diagonal position within the housing, the keeper plate 16 comes into substantial register with the housing structure opening and thus can be readily moved into and out of the housing opening by actuation of the adjusting screw 18. This relationship is shown generally in the drawings and particularly in FIGURES 4, 5, 6 and 9.

The continuous channel shaped support housing 13 is of a type well known in the art. A continuous opening is formed at the base thereof which is created by the spaced apart curved flanges 13a. The opening is configured to receive the head portion of a headed connector therethrough. The cross-sectional configuration of the support housing 13 is substantially U-shaped as shown in FIGURES 2 and 4.

An embodiment of a separate insert housing 12 which can be utilized with the instant invention is shown in FIGURES 8 and 9. The insert housing 12 consists of a substantially U-shaped base member 24 having outwardly extending flange portions 25. The central portion of the base member 24 is provided with a rectangular slotted opening 23 through which the head block is inserted as shown in FIGURE 9. The head assembly 11 operatively engages the flange portions 12a of the insert housing 12.

The cover member 26 is also of a U-shaped configuration and matingly nestles within the base member 24 to form the insert housing 12. The cover member is provided with horizontally extending end portions 27 that are provided with positioning holes 28 so that the insert housing 12 can be nailed into its use position within a wall or ceiling surface. Although the preferred embodiment of the invention has been described herein as having a head block 14 and a clamping plate 17 that have diagonally cut end portions, it is considered to be within the scope of the invention that the end portions of the head block 14 and the clamping plate 17 have any desired configuration. The important factor is that parallel spaced apart head block 14 and clamping plate 17 members are provided for selective positioning across the opening of a housing structure and which are fixedly associated with an intermediate alignment plate 16 which is matingly insertable into the opening of the housing structure so as to selectively lock the head block 14 and clamping plate 17 in any desired pre-determined non-rotatable position across the housing opening.

*Operation*

In operation, a connector or pipe rod 15 of any desired length is cut from rod stock. The end of the connector rod 15 is then inserted into the connector rod hole 19 provided in the head block 14. The connector rod 15 is then secured to the head block 14 by actuation of a set screw thereagainst. The set screw is provided in the set screw hole 21.

The alignment or keeper plate 16 is slidably positioned on the connector rod by passing the connector rod 15 through a connector rod hole provided through the alignment or keeper plate 16. The clamping plate 17 is then slidingly positioned on the connector rod 15 by passing the connector rod 15 through a connector rod hole provided through the clamping plate 17. The keeper or alignment plate 16 is thus positioned between the clamping plate 17 and the head block 14.

The head assembly 11 is then assembled by use of the adjusting screw 18. The head of the adjusting screw 18 engages the bottom surface of the clamping plate 17, while the stem thereof passes freely upwardly through the clamping plate 17 and the alignment or keeper plate 16 to operatively engage the threaded adjusting screw hole 20 provided in the head block 14. Thus, the clamping plate 17 and the alignment plate 16 can be moved toward and away from the head block 14 by selective actuation of the adjusting screw 18. The head of the adjusting screw 18, being located below the clamping plate 17 and external of the housing, is easily accessible to a workman installing the unit.

As shown in FIGURE 2, the head block 14 of the head assembly 11 is inserted into the housing 13. This relationship is also shown in the cross-sectional view of FIGURE 3 taken on line III—III of FIGURE 2. It should be noted that in this position the alignment or keeper plate 16 is diagonally positioned in relation to and below the opening in the housing.

As shown in FIGURES 4 and 5, the head assembly 11 is rotated so that the head block 14 assumes a diagonal position within the housing. In this position the head block 14 rests on the flanges 13a diagonally across the housing structure opening. When the head assembly 11 is thus rotated, the alignment or keeper plate 16 is below and in substantial register with the housing opening. The alignment plate 16 can thus be selectively moved into and out of the housing opening by actuation of the adjusting screw 18. This relationship is shown in FIGURES 4, 5, 6 and 9.

In use, the workman can actuate the adjusting screw 18 so as to draw the clamping plate 17 toward the head block 14 located within the housing. The alignment or keeper plate 16 is also raised toward the head block 14 by the movement of the clamping plate 17. As soon as any portion of the alignment plate 16 enters the opening between the flanges 12a or 13a of the housing structure, the entire head assembly 11 is locked into position against rotation in relation to the housing. Thus, the head block 14 cannot be accidentally removed from the housing. However, the head assembly 11 is still loosely retained within the housing structure so that it can be longitudinally moved therein.

When the adjusting screw 18 is tightened further, the clamping plate 17 moves toward the head block 14 so as to clamp upon the flanged portions 12a or 13a therebetween. In this manner, the head assembly 11 is fixed to the housing structure and the head assembly 11 cannot be moved longitudinally therein.

It is thus seen that a self-aligning lockable head assembly 11 is provided which provides positive retention and alignment of a headed connector within a housing structure even though the headed connector remains free for longitudinal movement within the housing structure. The headed connector can then be fixedly locked to the housing structure after longitudinal adjustment thereof has subsequently been made to any desired point in the housing during the installation of the pipe.

This goal is effectively accomplished by the use of the keeper or alignment plate 16 which cooperates with the housing opening to anchor the head assembly against rotation thereof in relation to the housing but which still permits longitudinal movement of the head block within the housing.

It should be noted that the keeper plate 16 could be merged into the clamping plate 17 so as to form an integral raised extension thereon.

As shown in FIGURE 4, a pipe support yoke assembly 30 is selectively attachable to the lower end of the connector or pipe support rod 15 so as to support a pipe 29 therethrough. The yoke assembly 30 is suspended from the pipe support rod 15 by use of a collar 31 which is selectively attachable to the pipe support rod 15. The collar 31 is provided with a set screw therein so as to permit lockable mounting thereof on the pipe support rod 15.

It is thus seen that a head assembly for connectors is provided which has great versatility in use and which can be easily and economically fabricated.

Various modifications of the invention may be made without departing from the principle thereof. Each of these modifications is to be considered as included in the hereinafter appended claims unless these claims by their language expressly provide otherwise.

Having thus set forth the nature of my invention, I claim the following:

1. In a self-aligning headed connector for insertion into a flange insert housing defining an opening therein, the combination comprising:
   (a) a head block member provided with a connector rod extension, said head block member defining a threaded adjusting screw hole therethrough;
   (b) a clamping plate slidingly mounted on said connector rod extension in a parallel spaced apart relationship to said head block member, said clamping plate defining an adjusting screw hole therethrough;

(c) an alignment plate slidingly mounted on said connector rod extension intermediate of said head block member and said clamping plate, said alignment plate defining an adjusting screw hole therethrough and adapted to matingly engage an insert housing opening; and (d) an adjusting screw operatively provided through said adjusting screw holes in said clamping plate, in said alignment plate and in said head block permitting selective actuation of said clamping plate and said alignment plate toward and away from said head block, said adjusting screw cooperating with said connector rod extension and fixedly anchoring said head block and said clamping plate against relative rotational movement with respect to said alignment plate.

2. In an aligning and locking structure for headed connectors, the combination including:

(a) a head block for selective insertion into an insert housing, said head block defining a threaded adjusting screw hole therethrough;

(b) a connector rod integral with said head block and extending downwardly therefrom;

(c) a clamping plate slidingly mounted on said connector rod in a parallel spaced apart relationship to said head block, said clamping plate defining an adjusting screw hole therethrough;

(d) an adjusting screw operatively engaging said clamping plate, said adjusting screw extending upwardly through said clamping plate engaging said threaded adjusting screw hole in said head block permitting selective actuation of said clamping plate toward and away from said head block; and (e) an alignment plate slidingly mounted on said connector rod and said adjusting screw intermediate said clamping plate and said head block, said alignment plate fixedly positioned against relative rotational movement with respect to said clamping plate and said head block by action of said connector rod and said adjusting screw therethrough.

3. In a self-aligning lockable head structure assembly for connector rods, the combination including:

(a) a head block for selective insertion into a support housing, said head block fixedly receiving a connector rod and adjustably receiving an adjusting screw therein;

(b) a connector rod selectively attached to said head block and extending downwardly therefrom;

(c) a clamping plate slidably mounted on said connector rod in a parallel spaced apart relationship to said head block, said clamping plate operatively receiving an adjusting screw therethrough;

(d) an adjusting screw operatively connecting said clamping plate to said head block, said adjusting screw cooperating with said connector rod and maintaining said clamping plate in register with said head block and permitting selective actuation of said clamping plate toward and away from said head block; and (e) an alignment plate slidingly mounted on said connector rod and said adjusting screw intermediate said clamping plate and said head block, said connector rod and said adjusting screw rendering said alignment plate non-rotatable with respect to said clamping plate and said head block.

4. In a self-aligning and lockable headed connector for insertion into a housing structure having flanged portions which define an opening therein, the combination comprising:

(a) a head block for selective insertion into a housing structure so as to rest on said flanges across said opening, said head block defining a threaded adjusting screw hole therethrough;

(b) a connector rod integrally provided on said head block, said connector rod extending downwardly from said head block through said opening;

(c) a clamping plate slidingly mounted on said connecting rod in a parallel spaced apart relationship to said head block, said clamping plate defining an unthreaded adjusting screw hole therethrough;

(d) an adjusting screw operatively engaging said clamping plate and extending upwardly through said unthreaded adjusting screw hole in said clamping plate threadably engaging said threaded adjusting screw hole in said head block, said adjusting screw selectively actuatable to move said clamping plate toward said head block so as to clamp upon said flanged portions positioned between said clamping plate and said head block; and (e) an alignment plate positioned intermediate said head block and said clamping plate and fixed against relative rotation with respect to said head block and said clamping plate by action of said connector rod and said adjusting screw passing therethrough, said alignment plate selectively movable into non-rotatable mating engagement with said opening of said housing so as to prevent rotation of said head block within said housing.

5. In a pipe hanger assembly, the combination comprising:

(a) a support housing structure for headed connectors, said support housing structure provided with inwardly extending spaced apart flanges defining an elongate opening therebetween;

(b) a head block inserted into said support housing structure, said head block resting upon said flanges and across said opening, said head block defining a threaded adjusting screw hole therethrough;

(c) a connector rod provided on said head block, said connector rod depending downwardly through said opening;

(d) a clamping plate slidingly mounted on said connector rod in a parallel spaced apart relationship to said head block and external of said housing structure, said clamping plate defining an adjusting screw hole therethrough;

(e) an alignment plate slidingly mounted on said connector rod intermediate said clamping plate and said housing structure, said alignment plate defining an adjusting screw hole therethrough and matingly engaging said opening in said housing structure;

(f) an adjusting screw operatively provided through said adjusting screw holes provided in said clamping plate, in said alignment plate and in said head block permitting actuation of said alignment plate into selective mating engagement with said opening and actuation of said clamping plate into selective clamping engagement against said flanges, said adjusting screw cooperating with said connector rod and fixedly anchoring said head block and said clamping plate against relative rotational movement with respect to said alignment plate.

References Cited by the Examiner

UNITED STATES PATENTS 801,102 10/05 Quay.
2,529,686 11/50 Green _____ 24—263.3 X

FOREIGN PATENTS 1,235,665 5/60 France.

FRANK L. ABBOTT, *Primary Examiner.*

JOEL REZNEK, RICHARD W. COOKE, Jr., *Examiners.*